Sept. 6, 1927.  
L. B. OLIN  
1,641,192  
ICELESS REFRIGERATOR TANK  
Filed Sept. 13, 1926 2 Sheets-Sheet 1
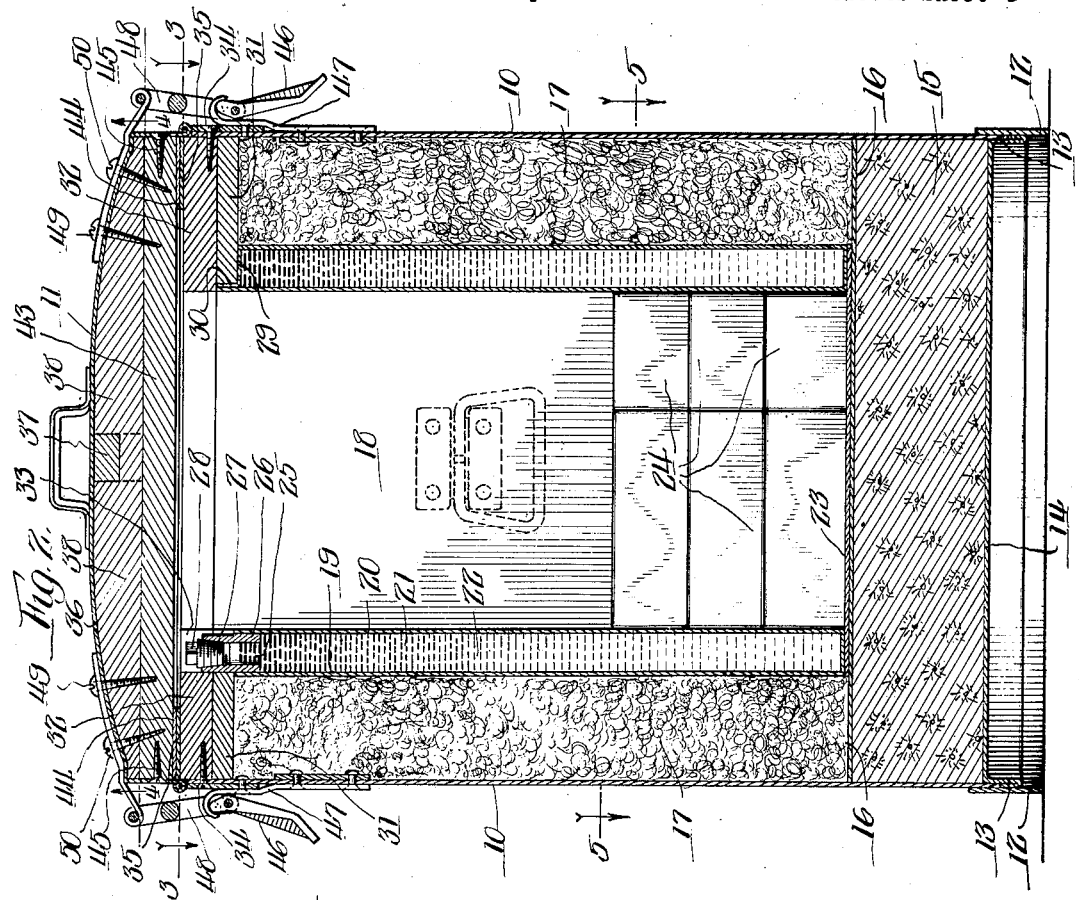
Inventor  
Louis B. Olin  
By Harvey L. Hanson  
attorney.

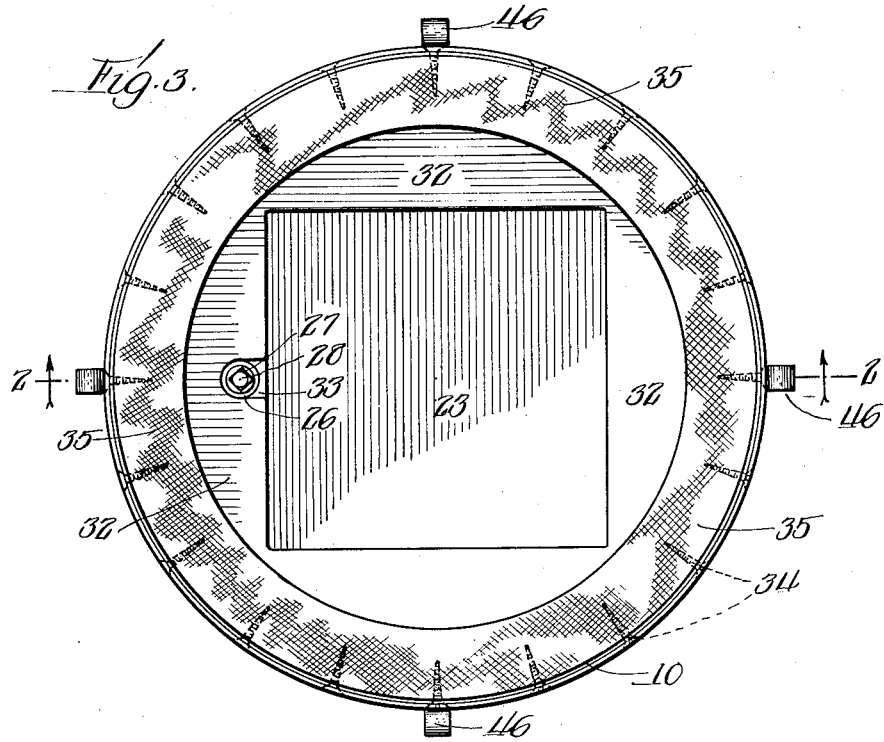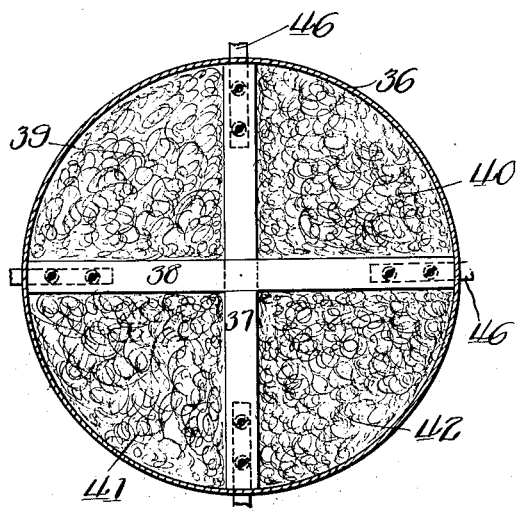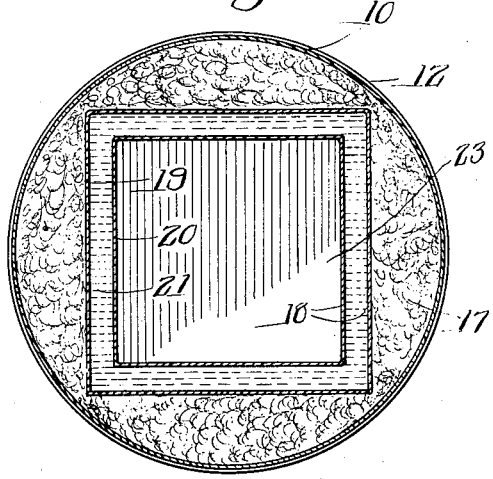

Patented Sept. 6, 1927.

UNITED STATES PATENT OFFICE.

LOUIS B. OLIN, OF CHICAGO, ILLINOIS.

ICELESS REFRIGERATOR TANK.

Application filed September 13, 1926. Serial No. 135,017.

The invention relates to an iceless refrigerator tank, and more particularly to a metallic refrigerator tank which may be used in transportation of food and other products, and especially ice cream and ices, from the place of manufacture thereof to the place, however distant, where it is to be consumed.

One of the main purposes and objects of the invention is to provide a receptacle or tank wherein the ice cream, or other food product, is kept in a cold condition for a relatively long time without the use of the ordinary refrigerant, that is, a mixture of cracked ice and salt. The ice cream, whether in brick or bulk form, is kept in a cold condition by the employment of an auxiliary receptacle within the outer tank, into which a brine or salt solution is poured, and insulation of kapok and cork, which are always kept dry and which surround the auxiliary receptacle.

Another important object of the invention is to construct a refrigerator tank which will keep the ice cream, or other food product, in a clean and wholesome condition until ready for consumption. In the usual form of ice cream tub, where the mixture of cracked ice and salt is used as the refrigerant, entirely surrounding the can in which the ice cream is packed, when ice cream is to be taken from the can the mixture of cracked ice and salt must be removed from the can around which it is packed. As a result of this refrigerating packing of cracked ice and salt around the ordinary ice cream can, occasionally it is found that when the covers over the ice cream are removed, the ice cream contained in the can is contaminated and spoiled by the mixture of cracked ice and salt getting into the ice cream. The construction of the tank of the invention entirely eliminates the danger of having the ice cream, or other product, contaminated and spoiled because of the elimination of the ice and salt mixture.

Some times the ice cream is also contaminated and spoiled because of the seepage and leakage of the salt brine from the ice and salt mixture into the ice cream container, as for instance, through the seams of the can. This difficulty is entirely avoided by the employment of the invention.

When ice cream is transported and delivered to homes, stores, lodges, churches, Pullman dining cars and other places, by manufacturers of ice cream, in the ordinary wooden tubs in which the mixture of cracked ice and salt completely surrounds the ice cream can, the ice and salt mixture overflows and scatters about the floor, rugs, carpets, linoleum, or other floor coverings, soiling and sometimes seriously damaging and ruining the same, and generally presents a disorderly, unclean and unsightly appearance. In order to keep the ice cream in good condition for any length of time in such tubs or containers, it is necessary to re-ice them, thus causing further disorder, uncleanliness and damage. After the ordinary wood tub employed for transporting ice cream has been used a relatively short time it becomes soaked with the salt brine, and usually leaves a mark on the floor, carpets, rugs, etc., and a wet, messy and sloppy trail along the path of its transportation. All of the above-mentioned disadvantages arising from the use of the mixture of cracked ice and salt are overcome by the use of the tank of the invention, since there is no moisture in connection with the tank which employs only the dry packing of kapok and cork.

The principal reason that ice cream has not been transported to relatively long distances heretofore is that the ice and salt mixture melts, and it is practically impossible to re-ice the tubs or containers when they are on trains or in transit. On the other hand metallic ice cream containers of the invention may be transported to distant points and retain their refrigerating qualities and keep the ice cream in a cold condition for a long time without the necessity of the replenishment of their refrigerating elements.

After filling the tank of the invention with the ice cream, and before transporting it, the tank is kept in a hardening room for about twenty-four hours. During transportation and while awaiting the opening of the tank at the place of consumption, the ice cream will remain cold without any substantial change in temperature for a period of about twenty-four hours, the brine tank, kapok insulation, and the cork insulation employed serving to keep heat from entering the inner chamber containing the ice cream.

The refrigerator tank of the invention is built of metal instead of wood, and will outlast the wood type of tank, having greater durability. Although the refrigerator tanks are handled roughly the metal tanks will withstand more rough usage than the wood tubs, and therefore there is less depreciation.

Another object of the invention is to reduce the weight of the refrigerator tank and the packing therein materially within the weight of the ordinary container and its packing so as to facilitate handling of the ice cream and effect savings in transportation and shipping charges, but, at the same time without decreasing the ice cream freezing and carrying capacities of the refrigerator tank but in fact increasing the refrigerating and carrying capacities, and at the same time decreasing the cost.

The invention will be explained and more readily understood when read in conjunction with the accompanying drawings, it being understood that modifications of the structure may be made without departing from the spirit of the appended claim forming a part hereof.

In the drawings:

Figure 1 is an elevational view of the metallic iceless refrigerator tank of the invention.

Figure 2 is a vertical sectional view of the tank on the line 2—2 of Figure 3.

Figure 3 is a top plan view of the tank on the line 3—3 of Figure 2, with the cover removed and looking downwardly.

Figure 4 is a view of the cover with the insulation retainer board removed and on the line 4—4 of Figure 2, looking in the direction of the arrows, and, Figure 5 is a cross-sectional view of the outer tank and inner container on the line 5—5 of Figure 2.

The iceless refrigerator tank of the invention comprises the tank 10, preferably of metal, having the cover generally designated 11, and the base band 12. The tank 10, base band 12, and the top of the cover 11 are preferably of a relatively heavy grade of metal, such as galvanized iron, which will withstand the rough usage which ice cream tanks are ordinarily given. In order to strengthen the bottom of the tank the annular flange 13 is provided. As shown in Figure 2 the bottom of the tank 10 is between the outer annular supporting flange 12 and the inner flange 13, providing three plies of metal at this place. These may be welded or riveted together, or otherwise suitably secured.

The tank is provided with the base or floor portion 14 upon which is deposited a relatively large and deep layer of granulated or comminuted cork or other insulator 15. A plate 16, which may be formed of metal or any other suitable material, is placed on the comminuted cork and separates the cork from the kapok insulation 17 and the brine tank generally designated 18 which are above it. Kapok is a silky down investing the seeds of *Ceiba pentandra*, a species of silk cotton tree of the Tropics, which is botanically related to the cotton plants and forms an excellent insulator for encircling or surrounding the brine tank within which the ice cream to be kept cold is contained. It will be understood that other soft or downy material may be used if desired. The brine tank 18, which is shown as a square tank, but which may be round, or of any other desired form, is completely encircled by the layer of kapok insulation 17. The brine tank 18 is preferably formed of metal, and has the outer wall 19 and the inner wall 20 which enclose the compartment 21 within which the brine 22 is contained. The brine 22 is preferably of any suitable salt solution. The brine tank 18 is provided with the floor or base portion 23, upon which are shown the bricks of ice cream 24. The bottom plate 23 of the tank may be suitably secured to the walls 19 and 20 by welding or any other desired means. In some cases it may be desired to dispense with the plate or bottom 23, whereupon the brine tank 18, without a top and without a bottom, may be set in the tank 10 at rest upon the separator plate 16. The brine solution 22 is poured into the compartment 21 through the inlet opening 25, in the sleeve or bushing 26, which is suitably plugged by the plug 27 having the integral nut portion 28. The plug 27 may be firmly and tightly screwed into place so that none of the brine will overflow into the interior ice cream compartment within the brine tank 18, nor into the kapok insulation 17, nor into the cork insulation 15. The cork and kapok insulations are kept in dry condition at all times. The interior or ice cream compartment within the brine tank 18 is also always dry.

The brine container 18 is formed at its top with the inwardly extending top enclosing wall 29, which is turned upwardly to form the flange 30, which is suitably secured to the inner wall 20, as by welding. The inwardly turned top wall 29 forms a ledge or seat upon which the board 31 may rest. The board 31 may be made up of sections, and is circular at its outer periphery and extends around the inner brine tank 18 against the flange 30 which surrounds the brine tank 18 at the top thereof. The board 31 forms the top cover for the kapok insulation 17. A relatively heavier board 32, which may be made in sections, is secured above the board 31 in any suitable manner. The boards 31 and 32 may be formed in a single piece if desired. A notch 33 is cut in the relatively thick board 32 for the reception of the sleeve 26 and the plug 27 for receiving the brine. The notch 33 is made sufficiently large for the operation of a tool to tighten or unloosen the plug 27. As shown, the board 32 is secured by the screws 34. An annular piece of webbing or other insulation material 35 is secured to the top outer peripheral portion of the board 32.

The cover generally designated 11 is provided with the heavy metallic top 36, which is curved and bent to the desired shape, as shown in Figures 1 and 2. Cross bars 37 and 38 maintain the metallic cover in its rounded form, and also provide four chambers, 39, 40, 41 and 42, for additional insulation of kapok. The kapok insulation is held within the chambers 39, 40, 41 and 42 by means of the insulation retainer board 43, which extends across the entire bottom of the cover 11. A webbing insulation 44, of any suitable material, is secured to the under face of the retainer board 43, and fits tightly and snugly against the corresponding web insulations 35 on the top of the board 32 of the main tank 10.

The top outer metallic covering 36 of the cover and the lower board 43, enclosing the cross bars 37 and 38 and the kapok contained within the compartments 39, 40, 41 and 42, are secured together by a plurality of screws 45 set at intervals in the side of the cover generally designated 11. The lower end of the cover 36 is rolled into a bead form to give the cover strength and a suitable finish.

The main tank 10 and the cover 11 are normally closed against the admission of air to the ice cream chamber within the brine tank 18. The closure of the tank and cover is effectually obtained by means of the plurality of clamps generally designated 46. These clamps are formed of the elongated hooks 47 suitably riveted or otherwise secured to the metallic tank 10 at the upper end thereof. The toggle member 48 of the clamp is firmly secured in the cover 11 by means of suitable screws 49 and 50. In order to clamp the cover 11 on the tank the handle portion of the toggle member 48 is fitted into the hook 47 and pressed downwardly. The screws 49 and 50 not only serve to secure the toggle member of the clamp 46 to the cover, but they hold the cross bars 37 and 38 in place between the upper metallic cover 36 and the wood retainer board 43.

The tank 10 is provided with a plurality of handles 51, and the cover is provided with the handle 52.

Having described the invention, what I claim and desire to secure by Letters Patent is:

In a refrigerator tank the combination of an exterior wall, a bottom wall or floor, a layer of granulated cork upon said floor, a plate above said granulated cork, a brine container having a brine compartment, another compartment within said brine container adapted to contain ice cream or other food products, an insulation of kapok encircling said brine container, said brine tank being offset at its top to form a ledge or seat, a wood cover over said kapok insulation and resting in said seat, said wood cover being notched, a sleeve and plug in said brine tank to enable brine to be poured in said tank, said sleeve and plug fitting in said notch, and a cover for said refrigerator tank adapted to be clamped upon said tank, said cover being provided with a plurality of compartments, and kapok insulation within said compartments, said ice cream compartment being encircled by the brine compartment and completely surrounded by insulation.

In witness whereof, I hereunto subscribe by name this 3rd day of September, A. D. 1926.

LOUIS B. OLIN.